UNITED STATES PATENT OFFICE.

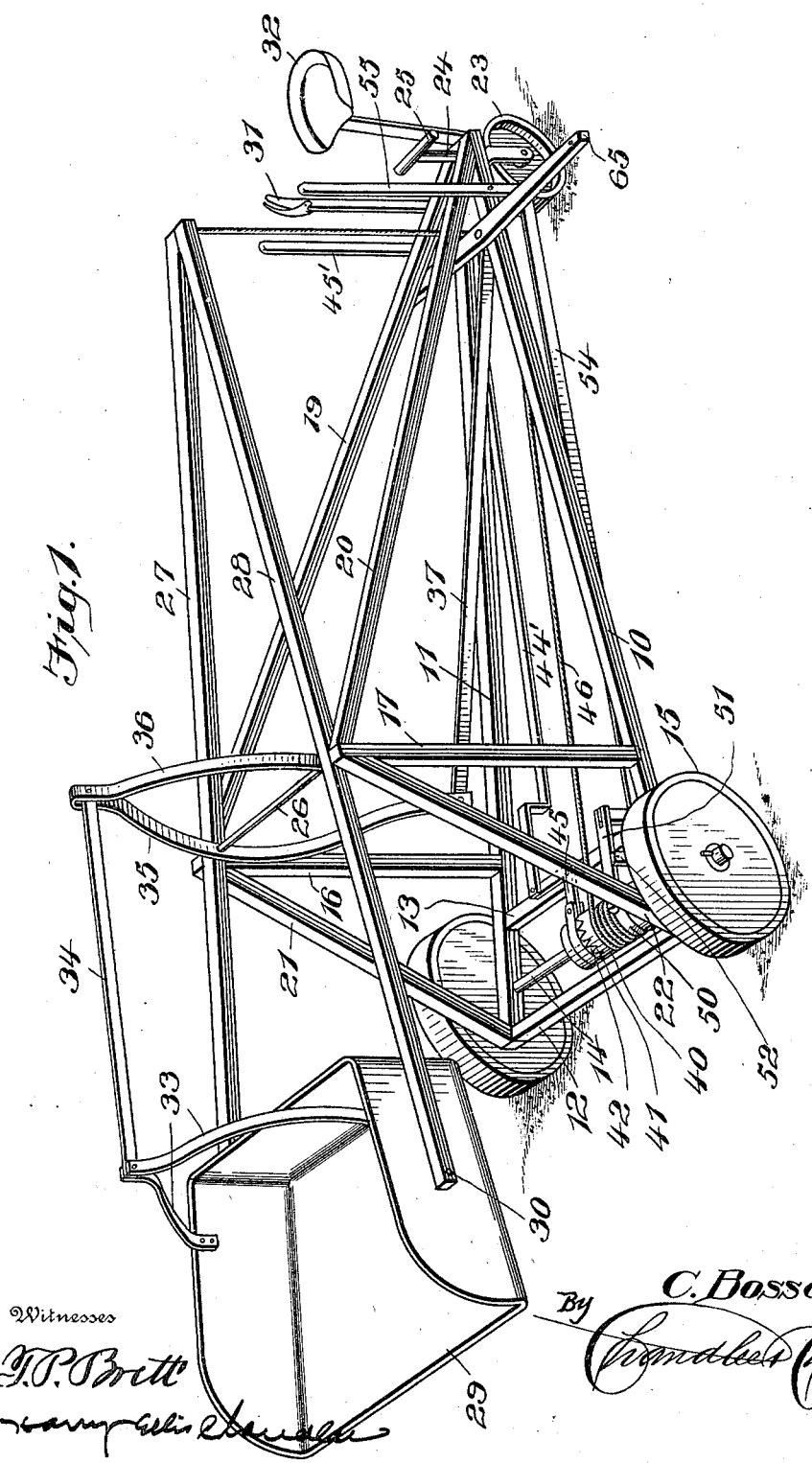

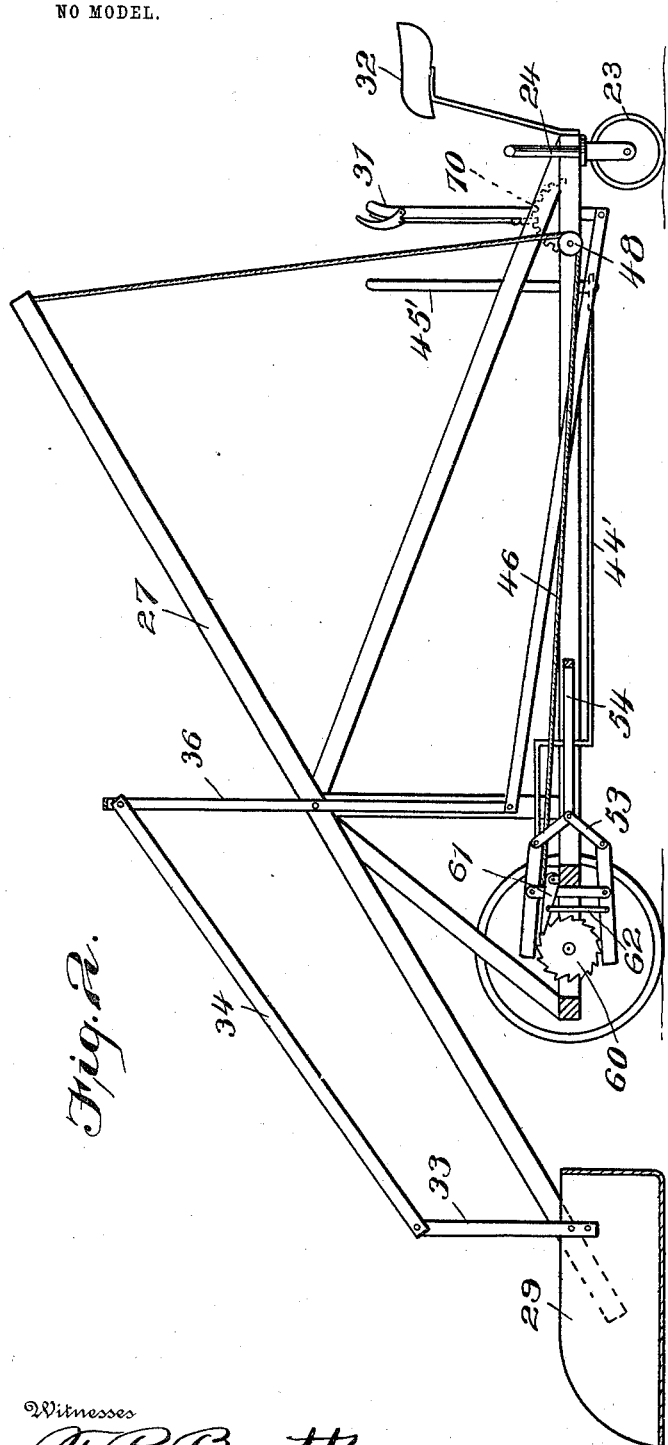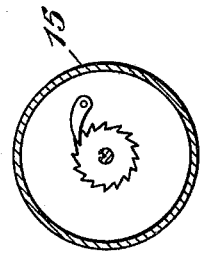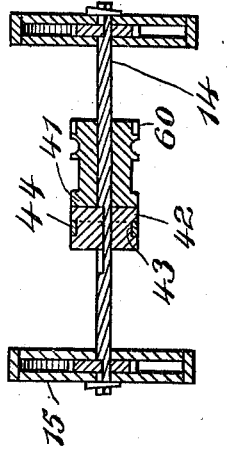

CHARLES BOSSELMAN, OF WORMS, NEBRASKA.

MACHINE FOR LOADING SAND.

SPECIFICATION forming part of Letters Patent No. 719,427, dated February 3, 1903.

Application filed October 18, 1902. Serial No. 127,874. (No model.)

*To all whom it may concern:*

Be it known that I, CHARLES BOSSELMAN, a citizen of the United States, residing at Worms, in the county of Merrick, State of Nebraska, have invented certain new and useful Improvements in Machines for Loading Sand; and I do hereby declare the following to be a full, clear, and exact description of the invention, such as will enable others skilled in the art to which it appertains to make and use the same.

This invention relates to machines for loading sand or earth; and it has for its object to provide a machine which may be drawn over a body of sand or earth and which may be caused to scoop up a quantity of material and then to raise it bodily while progressing and then to dump the material, the entire mechanism being controlled by the operator who sits at the rear of the machine.

In the drawings forming a portion of this specification, and in which like numerals of reference indicate similar parts in the several views, Figure 1 is a perspective view of the machine with the scoop in raised position. Fig. 2 is a vertical section taken longitudinally of the machine with the scoop lowered, the section being at one side of the pawl-and-ratchet mechanism. Fig. 3 is a transverse vertical section through the forward shaft and ground-wheels. Fig. 4 is a section through one of the ground-wheels and showing the ratchet mechanism therein.

Referring now to the drawings, the present machine comprises a frame including sills 10 and 11, which are connected at their rear ends and diverge forwardly and have a forward connecting cross-beam 12, there being a second cross-beam 13 disposed slightly in the rear of the beam 12 and parallel therewith.

Between the beams 12 and 13 is arranged a drive-shaft 14 or axle having ground-wheels 15, provided with ratchet mechanisms, as illustrated in Fig. 4, so that when the machine moves forwardly the shaft or axle will be positively rotated, while the wheels may be rotated rearwardly independently of the shaft or axle.

Upon the sills 10 and 11 in the rear of the cross-beam 13 are uprights or posts 16 and 17, from which lead beams 19 and 20, which converge downwardly and rearwardly and meet and rest with their extremities upon the rear end portions of the sills. Other timbers 21 and 22 extend from the upper ends of the posts 16 and 17 downwardly and divergently and rest with their extremities upon the forward end portions of the sills. There are thus formed two truss-frames, one including one sill and the other including the other sill, and these truss-frames are designed to support the load, there being a rear caster-wheel 23, pivotally mounted at the rear end of the machine, the stem 24 thereof being continued upwardly through and above the beams 19 and 20, where it has a foot-piece 25, for a purpose to be presently explained.

In the upper ends of the posts 16 and 17 is mounted a transverse shaft 26, which is engaged through the beams 27 and 28, which form the lifting-lever of the mechanism. The beams 27 and 28 meet at their rear ends and diverge forwardly, and between the forward ends of the beams is mounted a scoop 29, having lateral trunnions 30, which are pivotally mounted in bearings in the beams, so that the scoop may be adjusted to lie at any angle to facilitate scooping and dumping.

In the operation of the machine the scoop is lowered and adjusted to the proper angle to engage and scoop up the sand or earth or other material, and after the scoop is filled it is raised bodily and carried to the point of dumping, after which the scoop is tilted to discharge its contents. With the forward end of the scoop-lever lowered to engage the scoop the scoop is adjusted to the proper angle by manipulation of a hand-lever 31, located at the rear of the machine and in reach of the operator, who sits upon the seat 32, which is supported from the rear end of a frame and lies above and in the front of a foot-piece 25. The scoop is provided with upwardly and inwardly directed arms 33 at its rear end, and between the upper ends of these arms is pivoted a rod 34, which extends rearwardly and is pivoted at its rear end between the sides 35 and 36 of a lever mounted upon the shaft 26, the ends of said sides extending below the shaft and having pivoted therebetween a second rod 37, which is pivoted in turn to the lever 31. The last-named lever upon the shaft 26 consists of a single bar of metal bent upon itself to form the spaced members or sides 35 and a connecting-bight 38, the spaced members of sides being disposed divergently for half their lengths and then convergently, so that the lever is substantially diamond shape and withstands lateral strains such as would tend to bend an ordinary lever. When the hand-lever is moved in one direction, it will be seen that the forward end of the scoop will be raised, and when the hand-lever is moved in the opposite direction the forward end of the scoop will be lowered. Thus the correct position of the scoop at all times may be maintained. When the scoop is to be raised bodily, the rear end of the scoop-lever, which comprises the beams 27 and 28, is drawn downwardly, and when the scoop is to be lowered the rear end of the scoop-lever is permitted to rise. This operation of the scoop-lever is accomplished by means of the following mechanism: Upon the driving shaft or axle 14 is loosely mounted a winding-drum 40, having a clutch member 41 at one end, which is adapted for engagement by a clutch member 42, which is splined upon the axle, so that it may be moved into and out of engagement with the member 41 to cause the drum to rotate with or free from the axle. To move the member 42, it is provided with a circumscribing groove 43, in which is engaged the yoke 44 at one end of an angular lever 45, which is pivoted upon the beam 13, the opposite end of the angular lever having a rod 44' connected thereto, which extends rearwardly and is connected to a hand-lever 45', mounted upon the frame of the machine within reach of the operator. Attached to the winding-drum 40 is a cable 46, which is passed rearwardly between the sills 10 and 11 and then under and around a pulley-wheel 48, which is mounted between the rear end portions of the sills, and is then passed upwardly and connected to the rear end of the scoop-lever. When the hand-lever 45' is operated to engage the clutch members while the machine is advancing, the drum will be rotated and the scoop will be raised, as will be understood. When the clutch members are disengaged, the winding-drum will be free to rotate in a reverse direction and the scoop will descend by gravity. To prevent too rapid descent of the scoop, the winding-drum has a brake-drum 50 at one end, which is adapted for engagement by brake-levers 51, which are disposed one above and the other below the brake-drum and are pivoted at points between their ends between the arms 52, carried by the beams 13. The rear ends of the brake levers or beams project beyond the beam 13 and to each of them is pivoted a toggle-link 53, which at their opposite ends are pivoted to a rod 54, connected to the hand-lever 55, which is fulcrumed at the rear end of the frame of the machine. When the hand-lever 55 is drawn rearwardly, the toggle-lever is actuated to move the rear ends of the brake-beams apart and bring the opposite ends toward each other and against the brake-drum.

At times it is desired to hold the scoop in raised position and stationary while transporting it, and to accomplish this purpose it is necessary that the winding-drum be disconnected from the axle 14 after the scoop is raised and that while disconnected it be prevented from rotating to unwind the cable therefrom. To prevent this rotation of the winding-drum, a ratchet-wheel 60 is provided at the end of the brake-drum and a pawl 61 is mounted on the beam 13 in position to engage the ratchet-wheel and prevent reverse rotation thereof and of the drum. A link 62 is connected to the pawl and to the front end of the lower brake-beam, so that when the brake-beam is moved to engage the brake-drum the pawl will be moved from engagement with the ratchet.

Upon the sill 10 is mounted a doubletree 65, having singletrees connected thereto or other draft appliances, so that draft-animals may be hitched at both sides of the machine at the rear thereof.

In the operation of the machine the operator occupies the seat 32, and by manipulation of the mechanism, above described, lowers the scoop while the machine is drawn forwardly and the scoop is filled. While the machine continues to advance, the lever is operated to raise the scoop, and when the scoop is at the proper elevation the clutch mechanism is released and the pawl-and-ratchet mechanism holds the winding-drum with the scoop elevated. The machine is then moved to the place of discharge and the scoop is tilted to discharge its contents wherever desired. The machine may be then returned to its former location and the scoop lowered and again filled.

It will be understood that in practice modifications of the specific construction shown may be made and that any suitable materials and proportions may be used for the various parts without departing from the spirit of the invention.

It will be noted that the arms of the scoop have their point of pivotal connection with the actuating-rod the same distance from the trunnions as is the point of connection of said rod to the supplemental lever distant from the shaft on which the supplemental lever is mounted, so that if the supplemental lever is held vertical the arms of the scoop will be held vertical and the scoop itself will be held horizontal; also, that at whatever angle the supplemental lever stands the scoop will lie at a corresponding angle to a horizontal plane in whatever position the scoop-lever may be. To prevent movement of the supplemental lever when the scoop-lever is rocked, the hand-lever, which actuates the supplemental lever, is provided with a notched segment 70 and a latch for engagement therewith.

It will be understood that in advancing the machine it is guided by the operator, who manipulates the rear caster-wheel through the medium of the foot-piece 25.

What is claimed is—

1. A machine of the class described comprising a frame having supporting-wheels, a winding-drum, means for connecting the winding-drum to rotate with the wheels, a lever pivoted in the frame, a scoop pivoted to the lever, a cable attached to the lever and the winding-drum to actuate the scoop, and means for holding the scoop at a constant angle to a horizontal plane during its elevation.

2. In a machine of the class described, the combination with a pivoted lever and means for tilting it, of a scoop pivoted to the lever and means for holding the scoop at a constant angle to a horizontal plane as the lever is tilted.

3. In a machine of the class described, the combination with a pivoted lever comprising spaced beams, of a scoop mounted pivotally between the beams, a supplemental lever pivoted concentric with the first-named lever, a rod connecting the scoop with the supplemental lever at one side of its pivot, a hand-lever having means for holding it against movement and a second rod connecting the opposite end of the supplemental lever with the hand-lever.

4. A machine of the class described comprising a frame having supporting-wheels and a drive-axle, a winding-drum mounted loosely upon the axle, a clutch for connecting the winding-drum with the axle, a lever mounted in the frame, a scoop carried by the lever, a cable connected to the lever and to the winding-drum for actuating the lever in one direction, a brake-drum connected with the winding-drum, brake-beams disposed for engagement with the brake-drum and having means for operating them to retard the movement of the winding-drum, a ratchet-wheel carried by the brake-drum, a pawl normally engaged with the ratchet-wheel to prevent return movement of the winding-drum, and connections between the pawl and the brake-beams for releasing the pawl when the brake-beams are engaged with the drum.

In testimony whereof I affix my signature in presence of two witnesses.

CHARLES BOSSELMAN.

Witnesses:
ARTHUR KLINGENBERG,
RICHARD MARTIN.